(12) United States Patent
Scott

(10) Patent No.: US 6,945,676 B1
(45) Date of Patent: Sep. 20, 2005

(54) SUPPORT STRUCTURE FOR ELECTRIC LIGHTING FIXTURES

(76) Inventor: Dennis J. Scott, 355 Watt Dr., Fairfield, CA (US) 94585

( * ) Notice: Subject to any disclaimer, the term of this patent is extended or adjusted under 35 U.S.C. 154(b) by 220 days.

(21) Appl. No.: 10/346,345

(22) Filed: Jan. 16, 2003

(51) Int. Cl.[7] ............................................. F21V 21/00
(52) U.S. Cl. ..................... 362/396; 362/404; 24/598.4; 294/82.19
(58) Field of Search ................................ 362/147, 404, 362/396, 405, 406; 294/82.19, 82.2, 82.22; 24/599.9, 598.4, 598.5, 598.7, 598.8

(56) References Cited

U.S. PATENT DOCUMENTS

| | | | | |
|---|---|---|---|---|
| 1,731,942 A | * | 10/1929 | Simmons | .................... 362/406 |
| 2,791,817 A | * | 5/1957 | Burnham | .................. 294/82.22 |
| 3,430,307 A | * | 3/1969 | Burnham | .................. 294/82.19 |
| 4,039,220 A | * | 8/1977 | Stoops | ...................... 294/82.2 |
| 4,852,840 A | * | 8/1989 | Marks | ...................... 248/230.4 |
| 5,769,475 A | * | 6/1998 | Tylaska | ...................... 294/82.2 |

* cited by examiner

*Primary Examiner*—Thomas M. Sember
(74) *Attorney, Agent, or Firm*—Thomas R. Lampe

(57) ABSTRACT

Structure for supporting a lighting fixture includes a connector hook assembly releasably connected to a connector element extending from a support canopy. The connector hook assembly includes two relatively moveable connector hook members biased to a closed condition by a spring. One of the connector hook members has an internally threaded base for connection to a lamp suspension arm. Wiring passes from the suspension arm through an area formed by the internal threads of the base and through an aperture formed in the internally threaded connector hook member.

16 Claims, 4 Drawing Sheets

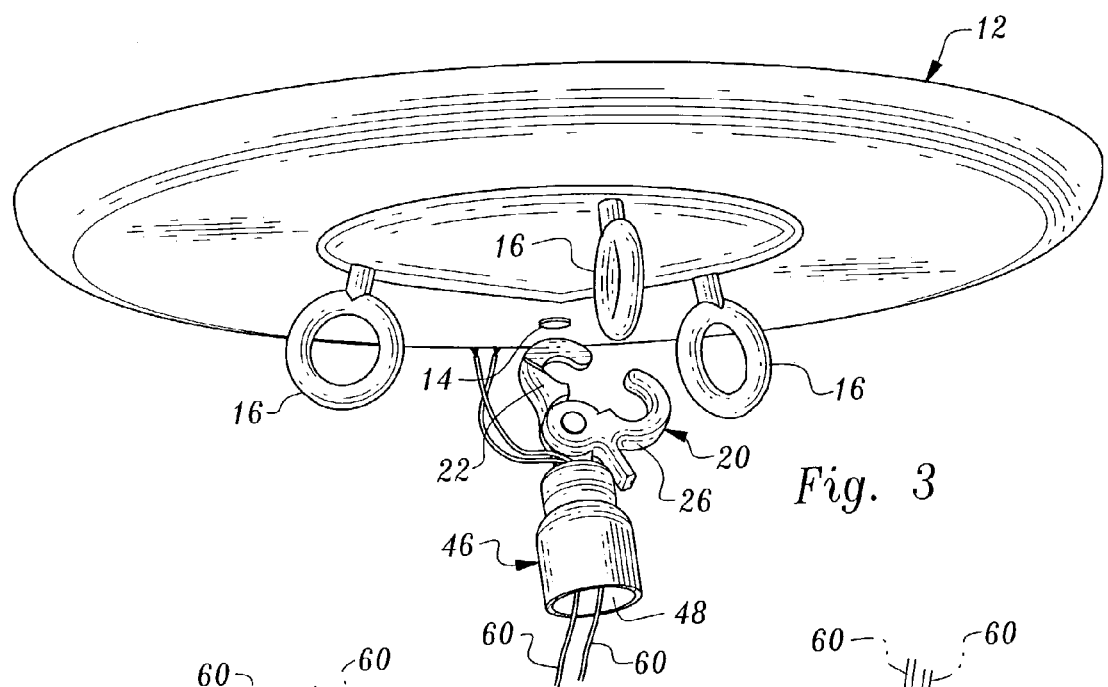
Fig. 3
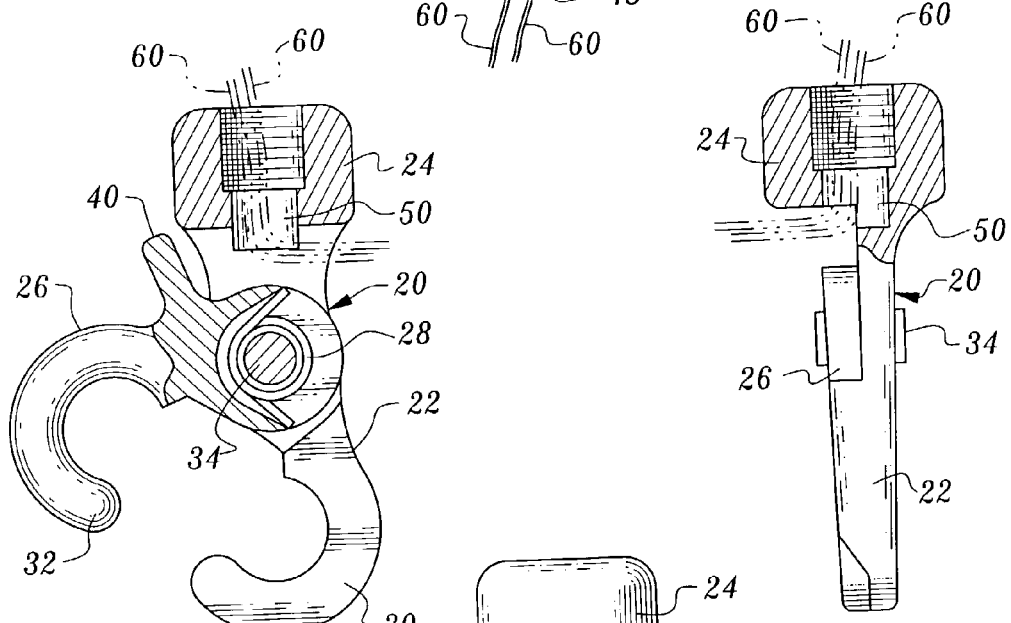
Fig. 4
Fig. 5
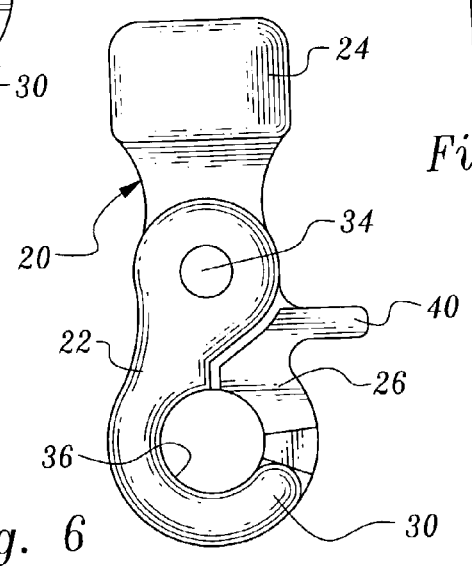
Fig. 6

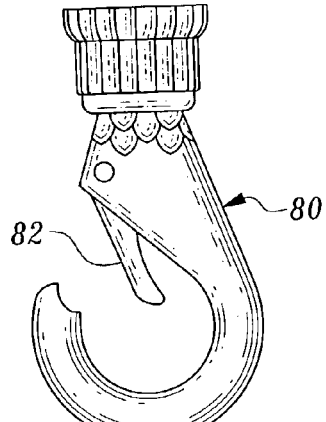
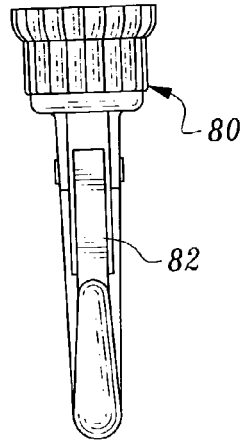
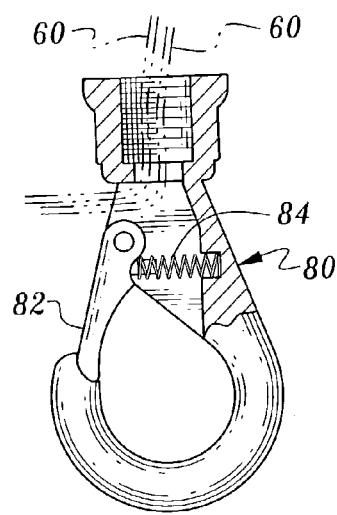
Fig. 7  Fig. 8  Fig. 9
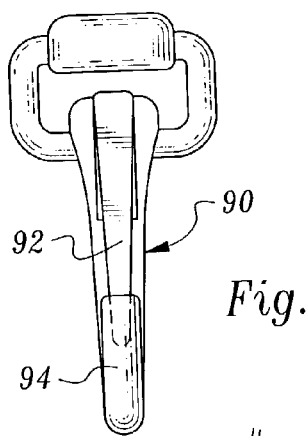
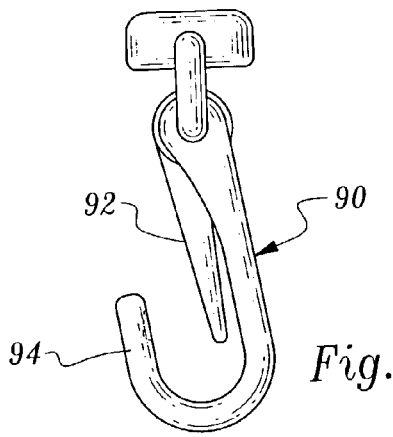
Fig. 10  Fig. 11
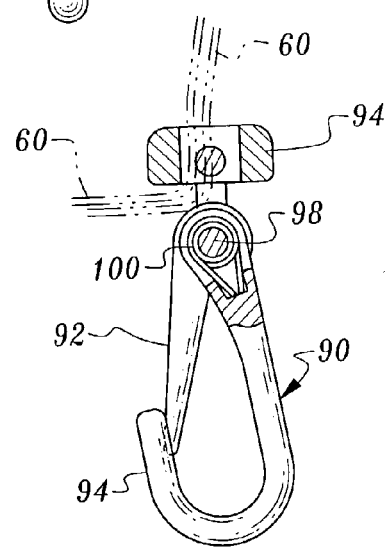
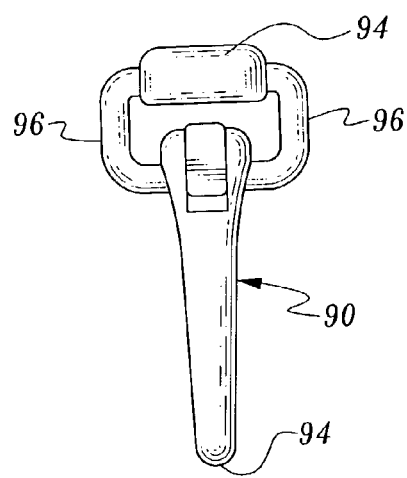
Fig. 12  Fig. 13

SUPPORT STRUCTURE FOR ELECTRIC LIGHTING FIXTURES

TECHNICAL FIELD

This invention relates to apparatus utilized to support lighting fixtures or lamps from a ceiling.

BACKGROUND OF THE INVENTION

It is well known to support a lighting fixture or lamp from a ceiling by suspension arms which extend downwardly from a canopy affixed to the ceiling. Wiring employed to illuminate the fixture extends downwardly from the canopy and extends through a connector arm to the fixture.

Attachment between the upper ends of the connector arms and the top canopy often involves the use of connector elements attached to the canopy which are in the nature of open hooks, the hooks passing through openings or loops formed at the upper ends of the connector arms. Alternatively, the hooks may be at the ends of the connector arms and cooperate with connector elements having openings or loops.

The use of open hooks to join connector arms and canopy connector elements can be a problem. An arm can be disconnected from its associated connector element under certain circumstances, such as structural movement resulting from an earthquake or an impact applied to the lamp, creating an unsafe situation.

DISCLOSURE OF INVENTION

The present invention relates to structure which will provide a secure interconnection between a connector arm and an associated connector element while also providing an electrical connection for a lamp depending from the connector arm.

The support structure includes a lighting fixture support canopy defining a support canopy wire opening.

A connector element is attached to and projects downwardly from the lighting fixture support canopy adjacent to the support canopy wire opening.

A connector hook assembly is releasably connected to the connector element. The connector hook assembly includes a first connector hook member having an internally threaded base. The hook assembly additionally includes a second connector hook member pivotally connected to the first connector hook member.

A spring is connected to the first and second connector hook members.

Each of the first and second connector hook members has a distal end. The spring continuously biases the second connector hook member to maintain the distal end thereof in engagement with the distal end of the first connector hook member. The first and second connector hook members define an opening receiving the connector element, the first and second connector hook members completely surrounding the connector element.

A lamp suspension arm threadedly engages the base of the first connector hook member and depends from the first connector hook member. The lamp suspension arm defines an elongated passageway.

Electrical wiring extends through the elongated passageway of the lamp suspension arm, through the base of the first connector hook member and through the wire opening of the support canopy.

Other features, advantages and objects of the present invention will become apparent with reference to the following description and accompanying drawings.

BRIEF DESCRIPTION OF DRAWINGS

FIG. 3 is an enlarged, perspective view of the canopy illustrating attachment of a connector hook assembly disposed at the end of a lamp suspension arm;

FIG. 4 is a greatly enlarged, front, elevational view in partial section illustrating components of a connector hook assembly;

FIG. 5 is a side, elevational view in partial cross-section of the connector hook assembly;

FIG. 6 is an enlarged, rear, elevational view illustrating the connector hook assembly in closed condition;

FIG. 7 is a front, elevational view of an alternative form of connector hook assembly, the assembly shown in open condition;

FIG. 8 is a side, elevational view of the assembly of FIG. 7;

FIG. 9 is a front, elevational view of the assembly of FIG. 7 with portions thereof broken away and shown in cross-section for illustrative purposes;

FIG. 10 is a side, elevational view of a third embodiment of connector hook assembly;

FIG. 11 is a front, elevational view of the assembly of FIG. 10 illustrating the assembly in open condition;

FIG. 12 is a front, elevational view of the assembly of FIG. 10 with portions thereof broken away and illustrated in cross-section;

FIG. 13 is a side, elevational view of the connector hook assembly of FIG. 10.

MODES FOR CARRYING OUT THE INVENTION

Referring now to FIGS. 1–6, lamp support structure constructed in accordance with the teachings of the present invention is illustrated.

Figure 1:
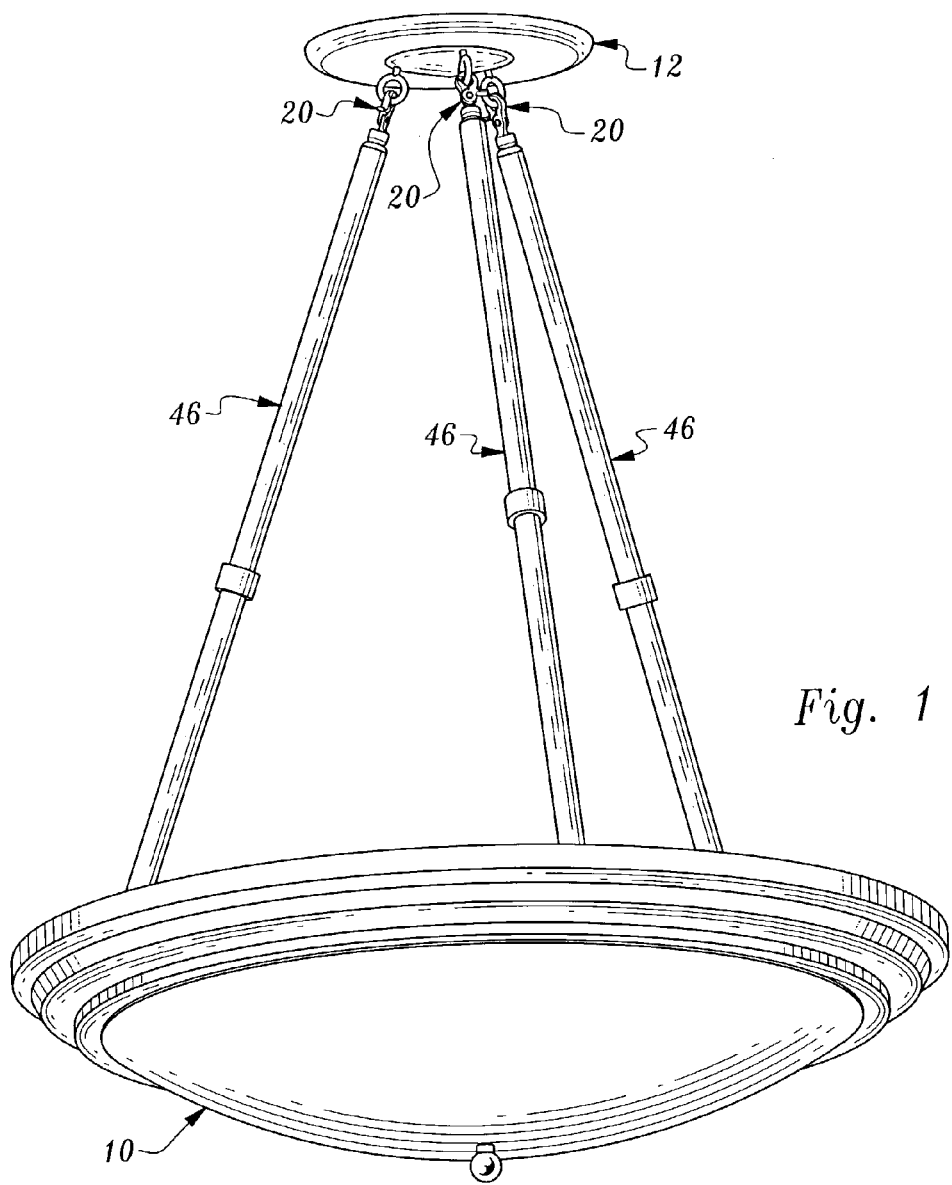
FIG. 1 is a perspective view illustrating a lighting fixture or lamp suspended by structure constructed in accordance with the teachings of the present invention.
Figure 2:
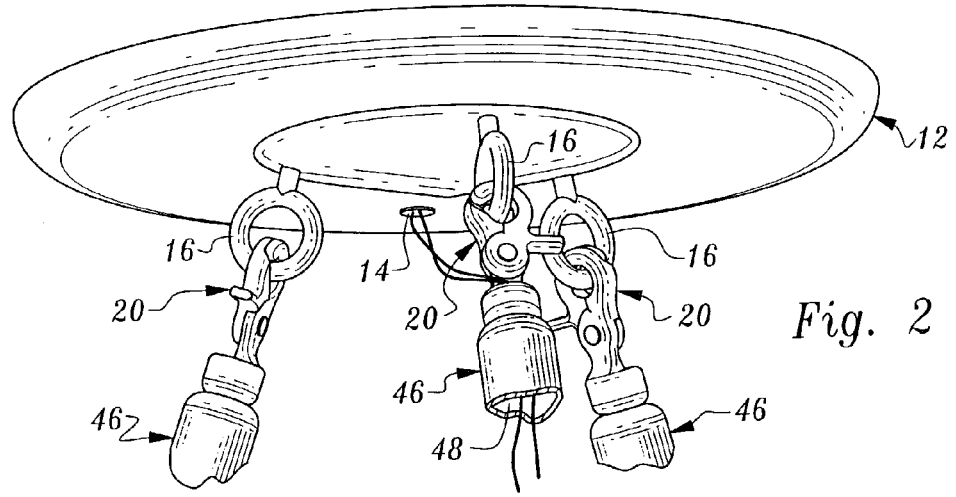
FIG. 2 is an enlarged, perspective view illustrating a support canopy having connector hook assemblies connected thereto, the connector hook assemblies being disposed at upper ends of lamp suspension arms.

FIG. 1 shows a lighting fixture or lamp 10 supported by such structure.

The support structure includes a lighting fixture support canopy 12 affixed in any conventional manner to a ceiling (not shown). A wire opening 14 is formed in the top canopy and provides access to live wiring disposed above the ceiling.

Attached to and projecting downwardly from the lighting fixture support canopy adjacent to the support canopy wire opening are four connector elements 16 in the form of closed rigid loops defining loop openings.

A connector hook assembly 20 is releasably connected to each connector element. Each connector hook assembly includes a first connector hook member 22 having an internally threaded base 24, a second connector hook member 26 pivotally connected to the first connector hook member and a spring 28 connected to the first and second connector hook members. First connector hook member 22 has a curved distal end 30 and second connector hook member 26 has a curved distal end 32. The connector hook members may be of any suitable material such as brass or other metal. The first and second connector hook members are pivotally interconnected by a pivot member 34, which in the illustrated embodiment is a rivet.

Spring 28 is wrapped about rivet 34 and the spring has ends which respectively engage the first connector hook member 22 and the second connector hook member 26 to continuously urge the distal end 32 into engagement and registry with curved distal end 30. This normal condition is illustrated in FIG. 6 wherein it will be seen that the first and second connector hook members define an opening 36. When the connector hook assembly is in place on a connector element 16, the connector element 16 will be completely surrounded by the first and second connector hook members, the connector element of course being captured within opening 36 (see FIG. 2) and locked in place.

The second connector hook member 26 includes a manually engageable projection 40 for pivoting the second connector hook member relative to the first connector hook member against the continual bias exerted on the second connector hook member by the spring. FIGS. 3 and 4 show the second connector hook member 26 displaced from its normal closed position to its open position against the bias of the spring so that it may be readily installed or removed.

An elongated lamp suspension arm 46 is threadedly engaged with the internal threads in base 24 of each first connector hook member and depends from the associated first connector hook member. At least one of the arms 46 defines an elongated passageway 48, the base 24 of the first connector hook member associated therewith defining an aperture 50 adjacent to the internal threads of the base. The aperture 50 leads from an area of the base defined by the internal threads to an outer surface of the base. This is perhaps best shown in FIGS. 4 and 5.

Electrical wiring 60 extends upwardly from the lighting fixture or lamp 10 through the elongated passageway of lamp suspension arm 46 through the base 24 of the first connector hook member 22 operatively associated therewith and thence through the wire opening 14 in the top canopy. The wiring passes through aperture 50 of the first connector hook member and through the area of the base defined by the internal threads.

FIGS. 7–9 illustrate an alternative form of connector hook assembly 80. In this form of the assembly, the second connector hook member 82 is a substantially straight tang which is pivoted and normally biased by spring 84 to the position illustrated in FIG. 9. This is the condition assumed by the connector hook assembly when in place and while holding a lamp. Manual application of force directed to tang 82 will deflect it as shown in FIG. 7 so that it can be readily applied or removed.

FIGS. 10–13 illustrate a third form of connector hook assembly 90. Here also, the second connector hook member, member 92 is straight, engaging the curved distal end 94 of the connector hook assembly 90 when the connector hook assembly is employed to capture a connector element. In this arrangement, the base 94 is connected to the rest of the assembly by a member 96 including segments which curve inwardly to form a pivot 98 about which spring 100 is wrapped.

Figure 14:
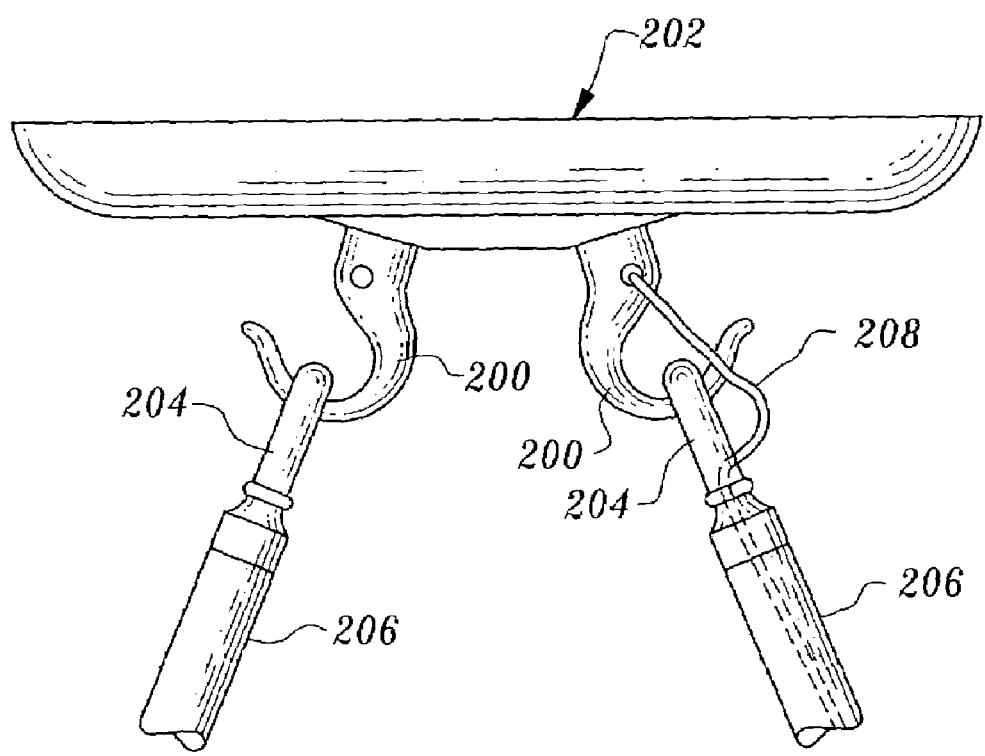
FIG. 14 is an elevational view of a portion of typical prior art lamp suspension structure in the vicinity of a top canopy.

FIG. 14 should be referred to as an example of a typical prior art arrangement. In this typical prior art embodiment, open hooks 200 extend downwardly and are attached to canopy 202. These hooks pass through holes defined by loop members 204 at the ends of support arms 206. The wiring 208 passes from the top end of one the elongated arms up to the top canopy.

The invention claimed is:

1. In combination:
   a lighting fixture support canopy defining a support canopy wire opening;
   a connector element attached to and projecting downwardly from said lighting fixture support canopy adjacent to said support canopy wire opening;
   a connector hook assembly releasably connected to said connector element, said connector hook assembly including a first connector hook member having an internally threaded base, a second connector hook member pivotally connected to said first connector hook member, and a spring connected to said first and second connector hook members, each of said first and second connector hook members having a distal end, said spring continuously biasing said second connector hook member to maintain the distal end of said second member in engagement with the distal end of said first connection hook member whereby said first and second connector hook members define an opening receiving said connector element, with said first and second connector hook members completely surrounding said connector element;
   a lamp suspension arm threadedly engaged with the base of said first connector hook member and depending from said first connector hook member, said lamp suspension arm defining an elongated passageway; and
   electrical wiring extending through the elongated passageway of said lamp suspension arm, through the base of said first connector hook member and through the support canopy wire opening.

2. The combination according to claim 1 wherein the base of said first connector hook member defines an aperture adjacent to the internal threads of said base leading from an area of said base defined by the internal threads to an outer surface of said base, said wiring passing through said through the area of said base defined by said internal threads.

3. The combination according to claim 1 wherein said first and second connector hook members are pivotally connected by a pivot member extending therethrough at a location on said hook assembly spaced from said base and spaced from the distal ends of said first and second connector hook members.

4. The combination according to claim 3 wherein said spring is wrapped about said pivot member and includes two spring ends, one of said spring ends exerting biasing forces on said second connector hook member.

5. The combination according to claim 1 wherein the distal ends of said first and second connector hook members are both curved.

6. The combination according to claim 1 wherein the distal end of said first connector hook member is curved and the distal end of said second connector hook member is substantially straight.

7. The combination according to claim 1 wherein said second connector hook member includes a manually engagable projection for pivoting the second connector hook member relative to the first connector hook member against the bias exerted on said second connector hook member by said spring.

8. The combination according to claim 1 wherein said connector element includes a closed rigid loop defining a loop opening accommodating said connector hook assembly.

9. A connector hook assembly for releasable connection to a connector element extending downwardly from a lighting fixture support canopy, said connector hook assembly including a first connector hook member having an internally threaded base, a second connector hook member pivotally connected to said first connector hook member, and a spring connected to said first and second connector hook members, each of said first and second connector hook members having a distal end, said spring continuously biasing said second connector hook member to maintain the distal end of said second member in engagement with the distal end of said first connector hook member whereby said first and second connector hook members define an opening for receiving said connector element, said base defining an aperture adjacent to the internal threads of said base leading from an area of said base defined by the internal threads to an outer surface of said base for accommodating electrical wiring.

10. The connector hook assembly according to claim 9 wherein said first and second connector hook members are pivotally connected by a pivot member extending therethrough at a location on said hook assembly spaced from said base and spaced from the distal ends of said first and second connector hook members.

11. The connector hook assembly according to claim 10 wherein said spring is wrapped about said pivot member and includes two spring ends, one of said spring ends exerting biasing forces on said second connector hook member.

12. The connector hook assembly according to claim 9 wherein the distal ends of said first and second connector hook members are both curved.

13. The connector hook assembly according to claim 9 wherein the distal end of said first connector hook member is curved and the distal end of said second connector hook member is substantially straight.

14. The connector hook assembly according to claim 9 wherein said second connector hook member includes a manually engageable projection for pivoting the second connector hook member relative to the first connector hook member against the bias exerted on said second connector hook member by said spring.

15. In combination:
a lighting fixture support canopy;
a connector element attached to and projecting downwardly from said lighting fixture support canopy;
a connector hook assembly releasably connected to said connector element, said connector hook assembly including a first connector hook member having an internally threaded base, a second connector hook member pivotally connected to said first connector hook member, and a spring connected to said first connector hook member, and a spring connected to said first and second connector hook members, each of said first and second connector hook members having a distal end, said spring continuously biasing said second connector hook member to maintain the distal end of said second member in engagement with the distal end of said first connector hook member whereby said first and second connector hook members define an opening receiving said connector element, with said first and second connector hook members completely surrounding said connector element; and
a lamp suspension arm threadedly engaged with the base of said first connector hook member and depending from said first connector hook member.

16. A connector hook assembly for releasable connection to a connector element extending downwardly from a lighting fixture support canopy, said connector hook assembly including a first connector hook member having an internally threaded base, a second connector hook member pivotally connected to said first connector hook member, and a spring connected to said first and second connector hook members, each of said first and second connector hook members having a distal end, said spring continuously biasing said second connector hook member to maintain the distal end of said second member in engagement with the distal end of said first connector hook member whereby said first and second connector hook members define an opening for receiving said connector element, said first and second connector hook members being pivotally connected by a pivot member extending therethrough at a location on said hook assembly spaced from said base and spaced from the distal ends of said first and second connector hook members, said spring being wrapped about said pivot member and including two spring ends, one of said spring ends exerting biasing forces on said second connector hook member.

* * * * *